Feb. 13, 1962     J. L. PERROCHAT     3,020,611
FASTENING DEVICE FOR MOLDING
Filed Nov. 14, 1958
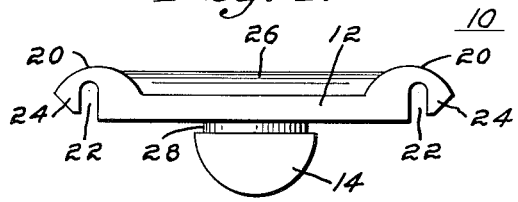
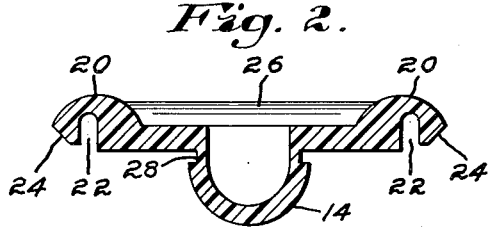
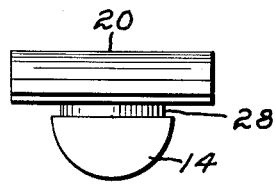
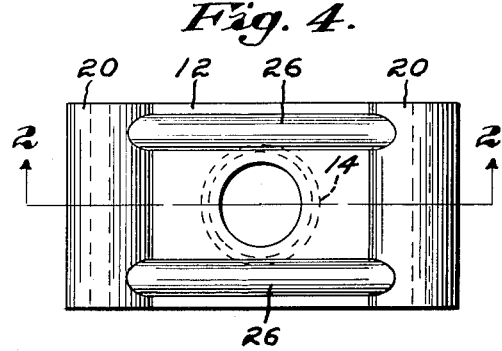
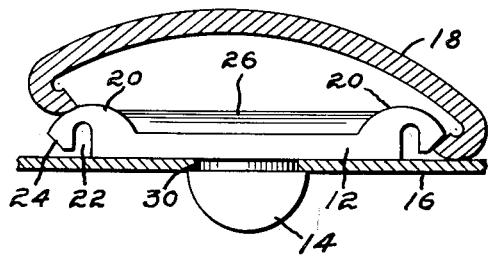
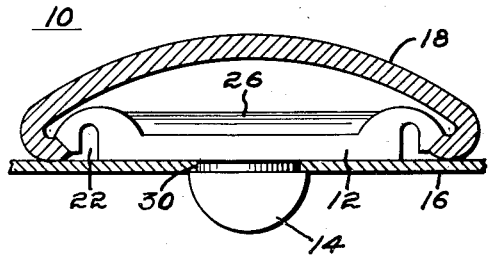
Inventor:
Jean L. Perrochat,
by Walter S. Jones
Att'y.

3,020,611
FASTENING DEVICE FOR MOLDING
Jean Léon Perrochat, Basel, Switzerland, assignor to
A. Raymond, Grenoble, France, a firm
Filed Nov. 14, 1958, Ser. No. 774,064
Claims priority, application Germany Nov. 14, 1957
1 Claim. (Cl. 24—73)

This invention relates to fastening devices and in particular to a fastener for attaching trim moldings or the like to automobile bodies.

The molding fasteners now in use are primarily constructed of metal and are snapped into apertures in the body wall in such a manner that the water integrity of the body is destroyed. A further problem exists in the use of these metal fasteners in that an electrolytic corrosive action is set up between the metal of the fastener and the car body that tends to hasten rusting with the resultant lack of holding power.

The object of this invention is to provide a fastener which is molded in one piece from a suitable resilient plastic having a shape and form which will effectively seal the aperture in the car body against the ingress of water.

A further object of this invention is to provide a fastening device which may be simply and inexpensively molded as a single unit.

Other objects of the invention will, in part, be obvious, and will, in part, appear hereinafter.

In the drawing:

FIG. 1 is a view in elevation of the fastener embodying the features of the invention;

FIG. 2 is a view in section on line 2—2 of the fastener in FIG. 4;

FIG. 3 is a view in elevation of the fastener as seen from the right side;

FIG. 4 is a top plan view of the fastener;

FIG. 5 is a view of the fastener snapped into engagement on panel with the molding aligned for engagement; and FIG. 6 is a view of the fastener snapped into engagement with the panel showing the molding trim in position.

Referring to the drawing, the fastener 10 as shown in FIGS. 1–6 is molded or formed in one piece from a suitable plastic material such as a polyamide or the like, and consists of a head portion 12 and a shank portion 14 adapted for axial snap engagement with a panel 16 so that a trim strip 18 may be positioned thereon. The head portion 12 is of generally rectangular form, being curved upwardly at the end portions, forming rounded shoulders 20. A pair of lateral grooves 22 are cut on the under surface of the head portion adjacent the ends so as to form a pair of resilient legs 24, the leg portions 24 have their terminal ends tapered for a purpose to be described hereinafter. Ribs 26 are molded integral with the upper surface of the head portion 12 extending transversely between the rounded shoulders 20 and tend to strengthen the device against flexing action. The shank portion 14 consists of a hemispherical distal end having a peripheral groove 28 disposed intermediate the terminal end 14 and the head portion 12. To assemble the fastener, the hemispherical shank portion 14 is snapped into engagement with the aperture 30 of the panel 16 so that the peripheral groove 28 will be firmly retained by the walls of the aperture 30. The molding strip 18 is then snapped into engagement with the resilient tapered legs 24 which will thereby flex toward each other allowing the molding to pass thereunder and then resiliently return to their normal shape to effectively secure the molding in position. It will be obvious to anyone skilled in the art that the hemispherical shank portion 14 will effectively seal the aperture from one side of the panel and the head portion 12 being in juxtaposed position on the reversed side of the panel will prevent the ingress of water.

While I have illustrated and described a preferred embodiment of my invention, the following claim best defines my invention.

I claim:

A fastener for a molding or the like installation formed from a single piece of molded plastic material adapted for axial insertion within an apertured support, said fastener having a head portion, resilient legs extending from said head portion for engaging a trim molding member, and a shank portion formed from the medial lateral surface of said head portion extending in a direction normal to said head portion and terminating in a support engaging portion, said resilient legs curved downwardly in substantially the same direction as said shank portion in spaced relation on opposite sides of said head portion and having free tapered terminal ends, said resilient legs being in spaced, substantially parallel relationship with the axis of said head portion.

References Cited in the file of this patent

UNITED STATES PATENTS

| | | |
|---|---|---|
| 2,610,879 | Pope | Sept. 16, 1952 |
| 2,681,716 | Black | June 22, 1954 |
| 2,759,390 | Edwards | Aug. 21, 1956 |
| 2,863,196 | Shears | Dec. 9, 1958 |
| 2,887,926 | Edwards | May 26, 1959 |

FOREIGN PATENTS

| | | |
|---|---|---|
| 667,946 | Great Britain | Mar. 12, 1952 |